(12) United States Patent
Kurz et al.

(10) Patent No.: US 10,927,975 B2
(45) Date of Patent: Feb. 23, 2021

(54) SOLENOID VALVE AND METHOD FOR PRODUCING A SOLENOID VALVE

(71) Applicant: Robert Bosch GmbH, Stuttgart (DE)

(72) Inventors: Edgar Kurz, Heilbronn-Horkheim (DE); Harald Speer, Freiberg (DE); Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 16/216,638

(22) Filed: Dec. 11, 2018

(65) Prior Publication Data

US 2019/0178410 A1 Jun. 13, 2019

(30) Foreign Application Priority Data

Dec. 13, 2017 (DE) ...................... 10 2017 222 638.2

(51) Int. Cl.
| | |
|---|---|
| *F16K 31/06* | (2006.01) |
| *F16K 27/02* | (2006.01) |
| *F16K 1/42* | (2006.01) |
| *B60T 8/36* | (2006.01) |

(52) U.S. Cl.
CPC .......... *F16K 31/0675* (2013.01); *B60T 8/363* (2013.01); *F16K 1/425* (2013.01); *F16K 27/029* (2013.01); *F16K 31/0665* (2013.01)

(58) Field of Classification Search
CPC ........ B60T 8/363; F16K 1/425; F16K 27/029; F16K 31/0665; F16K 31/0675
USPC ...................... 251/359, 365, 30.04
See application file for complete search history.

(56) References Cited

U.S. PATENT DOCUMENTS

| | | | | |
|---|---|---|---|---|
| 5,683,151 A | * | 11/1997 | Friedow | B60T 8/3675 303/119.2 |
| 5,718,489 A | * | 2/1998 | Megerle | B60T 8/3675 303/119.2 |
| 5,722,367 A | * | 3/1998 | Izydorek | F02M 3/09 123/339.13 |
| 5,810,330 A | * | 9/1998 | Eith | B60T 8/363 251/129.19 |
| 6,032,692 A | | 3/2000 | Volz | |

(Continued)

FOREIGN PATENT DOCUMENTS

| | | |
|---|---|---|
| CN | 202402759 U | 8/2012 |
| DE | 43 36 092 A1 | 4/1995 |
| DE | 10 2015 218 263 A1 | 3/2017 |

*Primary Examiner* — Kevin F Murphy
*Assistant Examiner* — Jonathan J Waddy
(74) *Attorney, Agent, or Firm* — Maginot, Moore & Beck LLP

(57) ABSTRACT

A solenoid valve includes a magnet assembly, a valve cartridge having a pole core, a valve sleeve connected to the pole core, an armature, and a valve body. The armature is guided in an axially movable manner within the valve sleeve and is coupled to a closing element. The magnet assembly generates a magnetic field via energizing a coil winding. The magnetic field moves the armature counter to a force of a spring. The valve body is positioned within the valve sleeve. A valve seat of the valve body forms a main valve with the closing element that sets a fluid flow between at least one first fluid opening and at least one second fluid opening. A positive connection between the valve sleeve and the valve body is formed to prevent movement of the valve body introduced into the valve sleeve counter to a direction of introduction.

14 Claims, 4 Drawing Sheets

(56) References Cited

U.S. PATENT DOCUMENTS

| | | | | |
|---|---|---|---|---|
| 6,199,961 | B1* | 3/2001 | Beck | B60T 8/3275 |
| | | | | 303/116.1 |
| 6,231,029 | B1* | 5/2001 | Park | B60T 8/363 |
| | | | | 251/129.15 |
| 6,529,106 | B1* | 3/2003 | Linhoff | B60T 8/363 |
| | | | | 251/129.15 |
| 7,198,249 | B2* | 4/2007 | Nakayasu | B60T 8/363 |
| | | | | 251/30.04 |
| 2006/0081803 | A1* | 4/2006 | Kawa | B60T 8/363 |
| | | | | 251/129.15 |
| 2008/0216643 | A1* | 9/2008 | Cano | B60T 8/363 |
| | | | | 91/392 |
| 2013/0193362 | A1* | 8/2013 | Guggenmos | B60T 8/363 |
| | | | | 251/318 |
| 2017/0045152 | A1* | 2/2017 | Bleeker | F16K 49/005 |
| 2017/0307099 | A1* | 10/2017 | Voss | F16K 25/005 |

* cited by examiner

SOLENOID VALVE AND METHOD FOR PRODUCING A SOLENOID VALVE

This application claims priority under 35 U.S.C. § 119 to patent application no. DE 10 2017 222 638.2, filed on Dec. 13, 2017 in Germany, the disclosure of which is incorporated herein by reference in its entirety.

BACKGROUND

The disclosure relates to a solenoid valve with a magnet assembly and a valve cartridge, which comprises a pole core, a valve sleeve, which is connected to the pole core, and an armature, which is guided in an axially movable manner within the valve sleeve and is coupled to a main closing element, wherein, by energizing a coil winding, the magnet assembly generates a magnetic field, which moves the armature counter to the force of a restoring spring, and wherein a valve body is positioned within the valve sleeve, wherein a main valve seat of the valve body forms with the main closing element a main valve, which sets a fluid flow between an at least one first fluid opening and an at least one second fluid opening, which solenoid valve is characterized in that a positive connection between the valve sleeve and the valve body is formed in such a way that it prevents a movement of the valve body introduced into the valve sleeve counter to its direction of introduction. Furthermore, a method for producing the solenoid valve is provided.

Known for example from the prior art is the patent application DE 10 2015 218 263 A1. This document relates to a two-stage high-pressure switching solenoid valve, as represented in FIG. 1. Valves of this type are also used in novel power braking systems in order to switch the pedal feel simulator on or off.

As can be seen from FIG. 1, the solenoid valve 1 comprises a magnet assembly 20, which comprises a coil winding 22, which is arranged in a housing shell 21, and a valve cartridge 10, which comprises a pole core 11, a valve sleeve upper part 12, which is connected to the pole core 11, an armature 13, which is guided in an axially movable manner within the valve sleeve upper part 12 and is coupled to a main closing element 17, and a valve lower part 18, which is connected to the valve sleeve upper part 12. The combination of the valve seat upper part 12 and the valve lower part 18 may be referred to as a valve sleeve 27. The valve lower part 18 comprises a valve body 19 with a main valve seat 19.1, which forms with the main closing element 17 a main valve, which is arranged between at least one first fluid opening 3 and an at least one second fluid opening 5 and sets a fluid flow between the at least one first fluid opening 3 and the at least one second fluid opening 5. For this purpose, a compression spring 13.3 also acts on the main closing element 17. The valve cartridge 10 is at least partially inserted, with an end on the pole core side, into the magnet assembly 20, wherein an upper end of the magnet assembly 20 lies against the pole core 11 and a lower end of the magnet assembly 20 lies against the valve sleeve upper part 12. By energizing the coil winding 22 applied to a winding carrier 24, the magnet assembly 20 generates a magnetic field, which moves the armature 13 counter to the force of a restoring spring 14. For this, the armature 13 has a spring support 15, which at least partially receives and guides the restoring spring 14.

A magnetic flux 23 of the generated magnetic field runs from the coil winding 22 through the valve sleeve upper part 12 via the armature 13 and the pole core 11 back into the coil winding 22. Here, an air gap 16, which in the non-energized state is formed between the armature 13 and the pole core 11 in the valve sleeve upper part 12, is arranged in the region of the lower end of the magnet assembly 20. As can also be seen from FIG. 1, the valve lower part 18 is configured as a sleeve, into which the annular valve body 19 is pressed with the main valve seat 19.1. As a result of the two-stage configuration, the solenoid valves 1 represented have in each case an auxiliary valve, which is formed by an auxiliary valve sleeve 13.1, an auxiliary closing element 13.2, which is connected to the armature 13, and an auxiliary valve seat 13.4, which is arranged at a through-opening on the main closing element 17, which is guided in an axially movable manner in the auxiliary valve seat 13.1, and has a small sealing diameter and throughflow, with the result that it is made possible for the auxiliary valve to be opened counter to a high pressure, which is obtained when there is a partially active and/or preloaded pressure build-up. The main valve with the main valve seat 19.1, which has a large seat cross section, and the main closing element 17 make possible a great throughflow, which as far as possible is unthrottled and is obtained when there is a fully active and/or self-induced pressure build-up. The valve cartridge 10 may be caulked by means of a caulking disk 9 in a fluid block that is not represented. In addition, an annular filter 7 is pushed onto the lower end of the valve cartridge 10.

In the prior art, the valve seat component of the main stage is generally pressed into the valve sleeve. The magnitude of the pressing force which can be achieved for the valve seat can only be increased to a limited extent in the construction according to the prior art by increasing the diameter over-pressing.

SUMMARY

By contrast, the valve according to the disclosure advantageously allows an alternative possibility for the valve body to be able to withstand higher pressing-out forces.

According to the disclosure, this is made possible by the features specified in the claims. Further refinements of the invention are the subject of dependent claims.

The solenoid valve according to the disclosure, with a magnet assembly and a valve cartridge, which comprises a pole core, a valve sleeve, which is connected to the pole core, and an armature, which is guided in an axially movable manner within the valve sleeve and is coupled to a main closing element, wherein, by energizing a coil winding, the magnet assembly generates a magnetic field, which moves the armature counter to the force of a restoring spring, and wherein a valve body is positioned within the valve sleeve, wherein a main valve seat of the valve body forms with the main closing element a main valve, which sets a fluid flow between an at least one first fluid opening and an at least one second fluid opening, is characterized in that a positive connection between the valve sleeve and the valve body is formed in such a way that it prevents a movement of the valve body introduced into the valve sleeve counter to its direction of introduction.

This is understood as meaning that a positive connection is performed for fixing the positioning of the valve body. In particular, the positive connection is intended to prevent possible pressing out of the valve body from its defined position, or to increase the force of resistance against possible pressing out. Pressing out is understood as meaning when for example the valve body has been inserted into the valve sleeve and positioned by means of a non-positive press connection—but the position of the valve body is changed on account of for example high fluid forces, in a manner corresponding to the axially acting fluid forces. It is in this case provided in particular that the positive connection is positioned in such a way—that is to say—is formed at a specific location—that in particular a movement of the valve body in a defined direction is prevented. For example, pressing of the valve body into an opening of the valve sleeve takes place during assembly in the direction of the target position. It is then intended by the positive connection that is formed after the pressing in of the valve body that the valve body is prevented from moving back in the direction of the opening of the valve sleeve. It is preferred that both a non-positive connection and a positive connection are thereby formed between the valve body and the valve sleeve. Advantageously, much higher pressing-out forces are made possible by such a connection—even without use of an additional component or a changeover to greater dimensions or other material classes. Therefore, this approach also represents a low-cost solution.

In an advantageous embodiment, the solenoid valve is characterized in that the at least one second fluid opening is formed at the valve sleeve.

In one possible refinement, the solenoid valve is characterized in that at least one of the at least one second fluid openings has a retaining tab, wherein in particular the retaining tab is formed in such a way that in the non-deformed state it does not hinder insertion of the valve body into the valve sleeve and in a deformed state it represents a positive connection between the valve lower part and the valve body.

This is understood as meaning that the valve sleeve has clearances which do not just serve exclusively as a fluid opening. The valve sleeve also has clearances which, by their form, produce retaining tabs in the cylindrical geometry of the valve sleeve. The term "retaining tabs" describes the function that a positive retention of the valve body in the valve sleeve is made possible by a deformation of these elements. A deformation of the retaining tabs takes place for example by means of radial caulking. In the case of circular fluid openings, the retaining tabs may be formed for this for example as a tab-shaped overhang directed into the area of the circle. Alternatively, it is also conceivable that the tab-shaped elements that are formed widen the circular fluid opening outwardly, and thereby produce a kind of horseshoe-shaped clearance. Other geometries and forms are of course also conceivable.

In one possible embodiment, it is also conceivable that it is only by the deformation of the retaining tab that an opening that serves as a fluid opening is created.

In a preferred configuration, the solenoid valve is characterized in that a multiplicity of second fluid openings are formed and a number of the second fluid openings have a retaining tab, and in particular that the retaining tabs are distributed uniformly over the circumference.

This should be understood as meaning that it is possible both for one fluid opening to formed as a tab and for a number of fluid openings to be formed as tabs. It goes without saying that it is also possible for all of the fluid openings to be formed as retaining tabs. Advantageously, there is a uniform distribution of the retaining tabs over the circumference. For example, three fluid openings are formed with retaining tabs, these being respectively arranged offset from one another by 120°.

In an alternative development, the solenoid valve is characterized in that the valve sleeve has a contour stop for the valve body, wherein in particular the contour stop is formed in such a way that a movement of the valve body in the direction of introduction is prevented.

This is understood as meaning that the valve sleeve comprises a geometrical form that limits the freedom of movement of the valve body. The contour stop consequently represents a further positive connection between the valve body and the valve sleeve. This contour stop may for example also be configured in such a way that it defines the positioning of the valve body.

In a further refinement, the solenoid valve is characterized in that the valve sleeve is configured in two parts and comprises a valve sleeve upper part and a valve lower part, the valve body being positioned in the valve lower part.

This is understood as meaning that the valve sleeve consists at least of two parts. For example, these are a valve sleeve upper part and a valve lower part. The components are advantageously connected to one another. The valve body is in this case pressed into the valve lower part.

In one possible configuration, the solenoid valve is characterized in that at least one of the following features is formed in the valve lower part:
 the positive connection between the valve sleeve and the valve body,
 the at least one second fluid opening,
 the at least one first fluid opening.

This is understood as meaning that the valve lower part not only receives the valve body but also that the described positive connection between the valve sleeve and the valve body is formed. In addition, the fluid openings may also be advantageously formed on the valve lower part itself.

According to the disclosure, a method is also provided. The method for producing a solenoid valve, with a magnet assembly and a valve cartridge, which comprises a pole core, a valve sleeve, which is connected to the pole core, and an armature, which is guided in an axially movable manner within the valve sleeve and is coupled to a main closing element, wherein, by energizing a coil winding, the magnet assembly generates a magnetic field, which moves the armature counter to the force of a restoring spring, and wherein a valve body is positioned within the valve sleeve, wherein a main valve seat of the valve body forms with the main closing element a main valve, which sets a fluid flow between an at least one first fluid opening and an at least one second fluid opening, is characterized in that a positive connection between the valve sleeve and the valve body is formed in such a way that a movement of the valve body introduced into the valve sleeve counter to its direction of introduction is prevented.

With respect to further explanations and advantages of the method, reference should be made to the previous comments with respect to the solenoid valve itself.

In one advantageous embodiment, the method is characterized in that at least one of the at least one second fluid openings has a retaining tab and the positive connection between the valve sleeve and the valve body is formed by means of plastic deformation of the at least one retaining tab.

In one possible refinement, the method is characterized in that the positive connection between the valve sleeve and the valve body is formed by means of a radial caulking.

This is understood in particular as meaning that the positive connection is formed by means of a radial caulking of the retaining tab, or of the tab-shaped element of the fluid opening.

In a preferred embodiment, the method is characterized in that the creation of all of the second fluid openings takes place by means of a single punching operation.

This is understood as meaning that the fluid openings on the cylindrical wall of the valve sleeve are produced by a punching operation. It should be emphasized here that all of the fluid openings are formed in a single punching operation. Advantageously, no additional step is required here for producing the retaining tabs, but merely an adapted die geometry of the punch. That is to say that both the fluid openings with retaining tabs and any fluid openings without retaining tabs are produced in one step. The punching process is advantageously carried out in particular as a radial punching process.

In one possible refinement, a method for producing a valve component consisting of a valve sleeve and a valve body is thereby obtained, wherein, in a first step, the main body of the valve sleeve is created, in a second step all required fluid openings including the retaining tabs are punched, in a third step the valve body is pressed into the valve sleeve, in a further step a radial caulking of the retaining tabs takes place to form a positive connection between the valve sleeve and the valve body.

According to the disclosure, a production device is also provided. The device for producing a solenoid valve, with a magnet assembly and a valve cartridge, which comprises a pole core, a valve sleeve, which is connected to the pole core, and an armature, which is guided in an axially movable manner within the valve sleeve and is coupled to a main closing element, wherein, by energizing a coil winding, the magnet assembly generates a magnetic field, which moves the armature counter to the force of a restoring spring, and wherein a valve body is positioned within the valve sleeve, wherein a main valve seat of the valve body forms with the main closing element a main valve, which sets a fluid flow between an at least one first fluid opening and an at least one second fluid opening, is characterized in that a positive connection between the valve sleeve and the valve body is formed in such a way that a movement of the valve body introduced into the valve sleeve counter to its direction of introduction is prevented, and at least one of the at least one second fluid openings has a retaining tab and the positive connection between the valve sleeve and the valve body is formed by means of plastic deformation of the at least one retaining tab, wherein the device is formed so as to allow the creation of all of the second fluid openings by means of a single punching operation.

This is understood as meaning for example a tool for carrying out the punching operation. This may also be a punch with a corresponding die geometry.

BRIEF DESCRIPTION OF THE DRAWINGS

It should be pointed out that the features that are described individually in the description can be combined with one another in any desired, technically appropriate way, and can indicate further refinements of the disclosure. Further features and practicalities of the disclosure result from the description of exemplary embodiments on the basis of the appended figures, in which.

DETAILED DESCRIPTION

Figure 1:
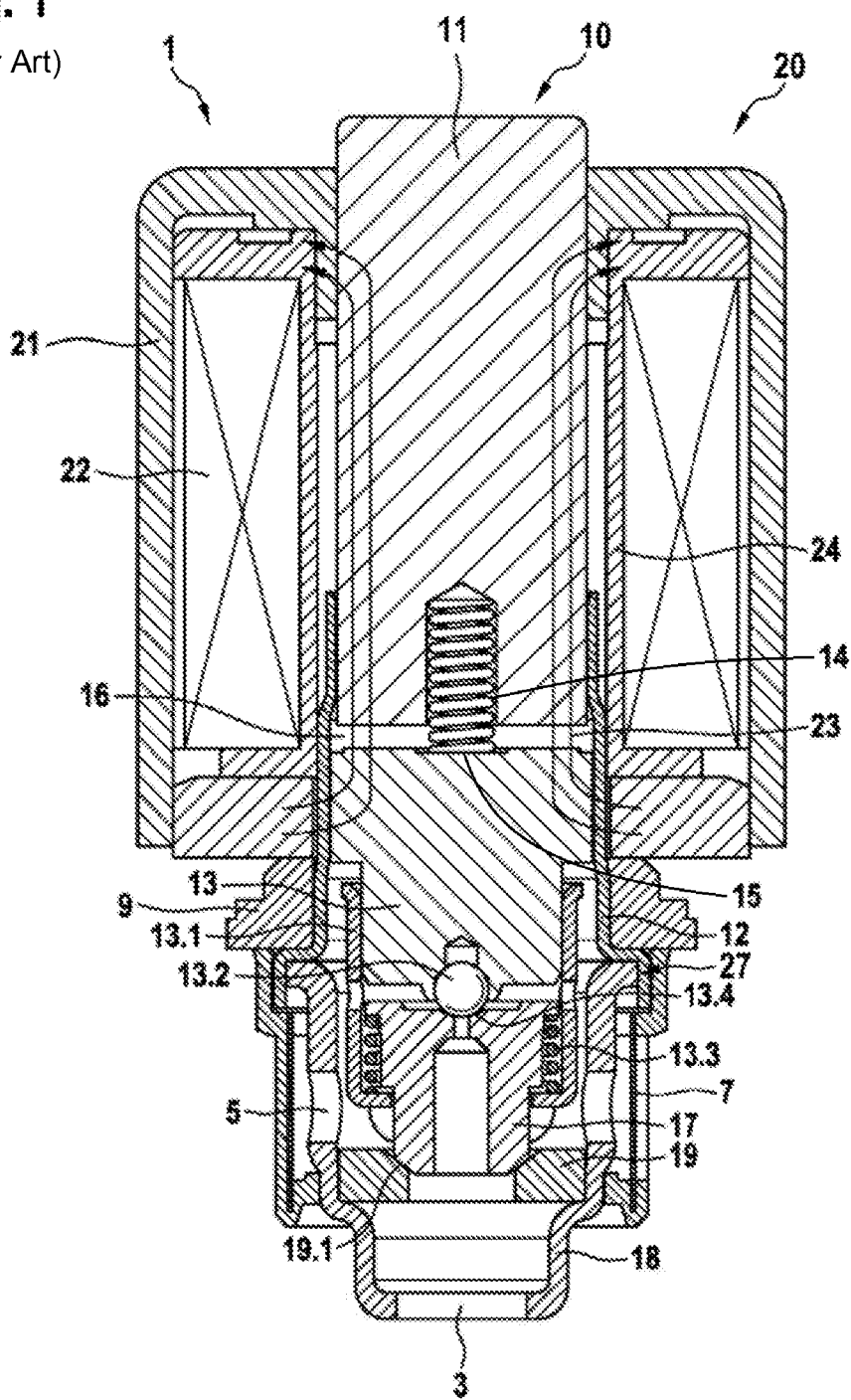
FIG. 1 shows a schematic sectional representation of a solenoid valve according to the prior art.

FIG. 1 shows a schematic sectional representation of a solenoid valve according to the prior art. In this respect, reference should be made to the comments with respect to the prior art.

Figure 2:
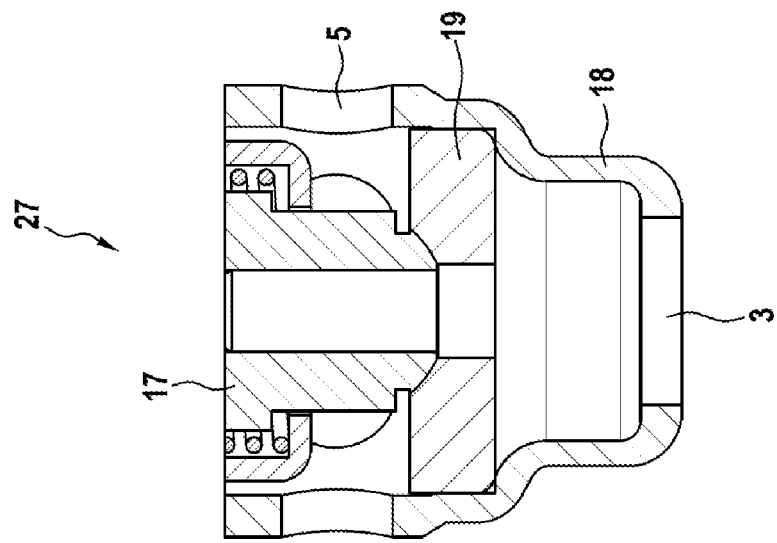
FIG. 2 shows schematic representations of part of a solenoid valve according to the prior art.
Figure 2:
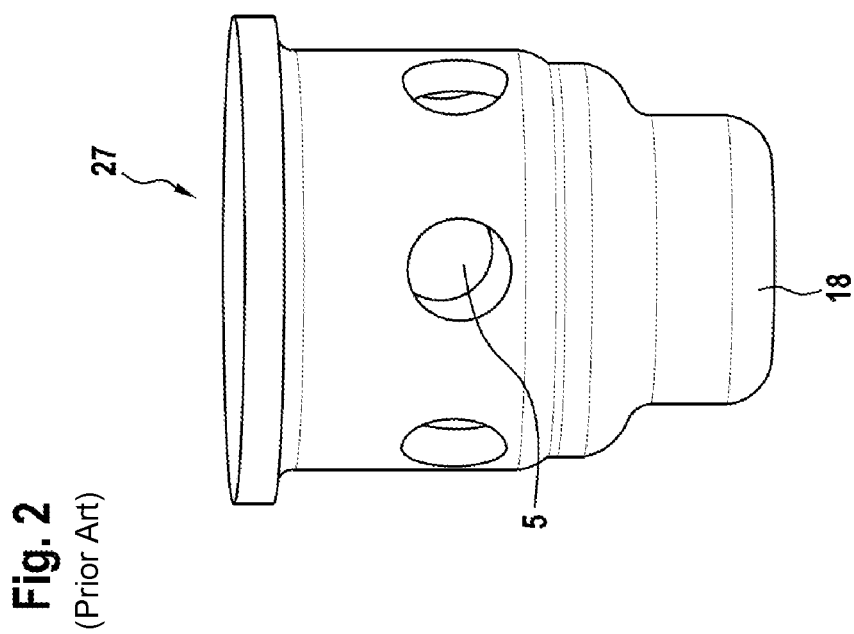

FIG. 2 shows schematic representations of part of a solenoid valve according to the prior art. Here, a spatial representation of the valve lower part 18 with the fluid openings 5 is shown in the left half of the image. In the right half of the image there is a sectional representation of the valve lower part 18. The valve body 18 and the main closing element 17 are also represented here.

Figure 3:
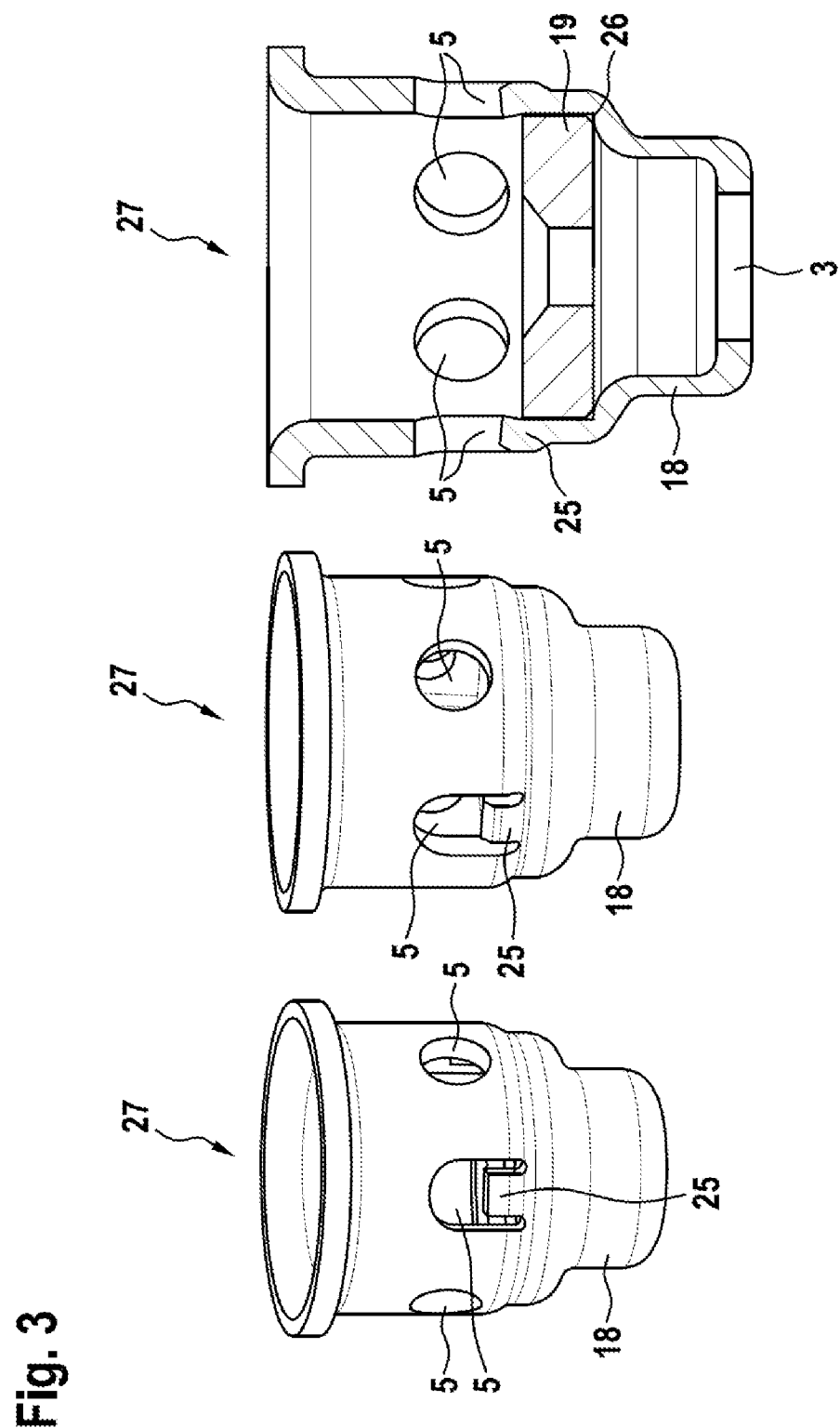
FIG. 3 shows schematic representations of part of a solenoid valve according to one possible embodiment of the disclosure.

FIG. 3 shows schematic representations of part of a solenoid valve according to one possible embodiment of the disclosure. Here, a spatial representation of the valve lower part 18 with the fluid openings 5 is shown in the depiction on the left. The middle one of the fluid openings 5 represented has in this case a retaining tab 25. The retaining tab is depicted in a non-deformed initial state. The depiction in the middle likewise shows a spatial representation of the valve lower part 18. Here, however, the retaining tab 25 is depicted in the deformed state. The deformation of the retaining tab 25 thereby forms the positive connection between the valve lower part 18 and the valve body 19, which is positioned within the valve lower part 18. The depiction on the right shows a sectional representation with the retaining tabs 25 formed by the caulking. Also represented here is the valve body 19, which has been introduced into the valve lower part 18 up to a contour stop 26. It can be seen here how a movement of the valve body 19 counter to its direction of introduction is prevented by means of the deformed retaining tabs 25. The main closing element 17 is also represented.

Figure 4:
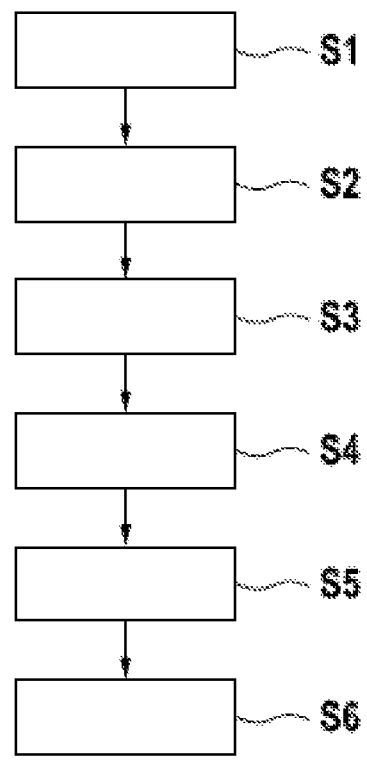
FIG. 4 shows a representation of the process according to one possible embodiment of the disclosure.

In FIG. 4, a representation of the method steps of one embodiment of the disclosure is shown. Here, in a first step S1, the creation of the basic form of the valve sleeve, or of the valve lower part, takes place. In a second step S2, the punching process takes place. Here, all of the fluid openings are created in only one process step. In other words, both the fluid openings with retaining tabs and the fluid openings without retaining tabs are produced in one punching operation. The punching operation is performed as a radial punching operation. In a next step S3, the insertion of the valve body into the valve sleeve, or the valve lower part, takes place. This takes place as pressing in. Here, the exact position of the valve body is also set. If appropriate, this may also be understood as an independent step S4. In a subsequent step S5, the formation of the positive connection between the valve sleeve, or the valve lower part, and the valve body takes place. For this, a radial caulking is performed. For example, the formed retaining tabs are bent over, in order to prevent possible pressing out of the valve body. Subsequently, in step S6, the fitting of the joined-together components into the solenoid valve, or the assembly of the solenoid valve, takes place.

What is claimed is:

1. A solenoid valve, comprising:
   a magnet assembly including a coil winding, the magnet assembly configured to generate a magnetic field via energizing the coil winding;
   a valve cartridge including a pole core;
   a valve sleeve connected to the pole core;
   an armature configured to be guided in an axially movable manner within the valve sleeve and coupled to a main closing element;
   a valve body introduced into the valve sleeve in a direction of introduction, the valve body including a main valve seat configured to form a main valve with the main closing element; and
   a connection element configured to form a positive connection between the valve sleeve and the valve body, and to prevent movement of the valve body counter to the direction of introduction,
wherein the magnetic field is configured to move the armature counter to a force of a restoring spring, and
wherein the main valve is configured to set a fluid flow between at least one first fluid opening and at least one second fluid opening, the at least one second fluid opening including a retaining tab that is configured to be deformed and corresponds to the connection element.

2. The solenoid valve according to claim 1, wherein the at least one second fluid opening is arranged on the valve sleeve.

3. The solenoid valve according to claim 1, wherein the retaining tab is configured such that, in a non-deformed state, the retaining tab does not hinder insertion of the valve body into the valve sleeve, and, in a deformed state, the retaining tab corresponds to the connection element.

4. The solenoid valve according to claim 1, wherein:
the at least one second fluid opening includes at least two second fluid openings;
the retaining tab is a plurality of retaining tabs;
a number of the at least two second fluid openings each includes a respective one of the plurality of retaining tabs; and
the retaining tabs are distributed uniformly over a circumference of the valve sleeve.

5. The solenoid valve according to claim 1, wherein:
the valve sleeve includes a contour stop for the valve body; and
the contour stop is configured to prevent the movement of the valve body in the direction of introduction.

6. The solenoid valve according to claim 1, wherein:
the valve sleeve includes a valve sleeve upper part and a valve lower part; and
the valve body is arranged in the valve lower part.

7. The solenoid valve according to claim 6, wherein at least one of (i) the connection element, (ii) the at least one second fluid opening, and (iii) the at least one first fluid opening is formed in the valve lower part.

8. The solenoid valve according to claim 6, wherein at least two of (i) the connection element, (ii) the at least one second fluid opening, and (iii) the at least one first fluid opening are formed in the valve lower part.

9. The solenoid valve according to claim 6, wherein each of (i) the connection element, (ii) the at least one second fluid opening, and (iii) the at least one first fluid opening is formed in the valve lower part.

10. The solenoid valve according to claim 1, wherein the valve sleeve defines a contour stop configured to prevent the movement of the valve body in the direction of introduction, the retaining tab spaced from the contour stop counter to the direction of introduction.

11. The solenoid valve according to claim 10, wherein opposed axial-most ends of the valve body are disposed entirely between the contour stop and the retaining tab.

12. A method for producing a solenoid valve including a magnet assembly having a coil winding and a valve cartridge having a pole core, the magnet assembly configured to generate a magnetic field by energizing the coil winding, the method comprising:
connecting a valve sleeve to the pole core;
coupling an armature to a main closing element, the armature configured to be guided in an axially movable manner within the valve sleeve;
positioning a valve body within the valve sleeve, the valve body including a main valve seat, the main valve seat forming a main valve with the main closing element; and
deforming a portion of the valve sleeve after positioning the valve body therein so as to form a positive connection between the valve sleeve and the valve body, the positive connection preventing a movement of the valve body counter to a direction of introduction of the valve body to the valve sleeve,
wherein the magnetic field is configured to move the armature counter to a force of a restoring spring,
wherein the main valve is configured to set a fluid flow between at least one first fluid opening and at least one second fluid opening, and
wherein deforming a portion of the valve sleeve includes plastically deforming at least one retaining tab to form the positive connection, and wherein at least one second fluid opening of the at least one second fluid opening includes the at least one retaining tab.

13. The method according to claim 12, further comprising:
producing the at least one second fluid opening via a single punching operation.

14. A device for producing a solenoid valve, the device configured to:
allow a production of at least one second fluid opening of the solenoid valve via a single punching operation, the solenoid valve including:
a magnet assembly including a coil winding and configured to generate a magnetic field via energizing the coil winding;
a valve cartridge including a pole core;
a valve sleeve connected to the pole core;
an armature configured to be guided in an axially movable manner within the valve sleeve and coupled to a main closing element; and
a valve body arranged within the valve sleeve and including a main valve seat, the main valve seat forming a main valve with the main closing element,
wherein the magnetic field is configured to move the armature counter to a force of a restoring spring,
wherein the main valve is configured to set a fluid flow between at least one first fluid opening and at least one second fluid opening,
wherein a positive connection between the valve sleeve and the valve body is formed such that a movement of the valve body introduced into the valve sleeve counter to a direction of introduction of the valve body is prevented,
wherein at least one second fluid opening of the at least one second fluid opening includes a retaining tab, and
wherein the positive connection between the valve sleeve and the valve body is formed via plastic deformation of the retaining tab.

\* \* \* \* \*